(12) United States Patent
Kono

(10) Patent No.: US 9,807,572 B2
(45) Date of Patent: Oct. 31, 2017

(54) MANAGEMENT SYSTEM AND MANAGEMENT METHOD

(71) Applicant: FUJITSU LIMITED, Kawasaki-shi, Kanagawa (JP)

(72) Inventor: Taki Kono, Kodaira (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/276,142

(22) Filed: Sep. 26, 2016

(65) Prior Publication Data

US 2017/0013420 A1    Jan. 12, 2017

Related U.S. Application Data

(63) Continuation of application No. PCT/JP2014/059595, filed on Mar. 31, 2014.

(51) Int. Cl.
*H04W 4/04* (2009.01)
*G06Q 50/30* (2012.01)

(52) U.S. Cl.
CPC ............ *H04W 4/046* (2013.01); *G06Q 50/30* (2013.01)

(58) Field of Classification Search
CPC ...... G06Q 50/30; H04W 4/046; H04W 24/04; H04W 8/24; H04W 48/16; H04W 4/005;
(Continued)

(56) References Cited

U.S. PATENT DOCUMENTS

2004/0068520 A1* 4/2004 Masaoka ................ G06Q 30/02
2009/0028175 A1   1/2009 Tsudaka

FOREIGN PATENT DOCUMENTS

JP    4-79619    3/1992
JP    5-83180    4/1993
(Continued)

OTHER PUBLICATIONS

International Search Report dated Jul. 1, 2014, in corresponding International Application No. PCT/JP2014/059595.
(Continued)

*Primary Examiner* — Phuc H Doan
(74) *Attorney, Agent, or Firm* — Staas & Halsey LLP

(57) ABSTRACT

A management system includes: a mobile terminal; a plurality of base stations; and a management device. The mobile terminal includes a first processor that executes a first process including transmitting management information including identification information of the mobile terminal using short waves. The base stations include a second processor that executes a second process including first receiving the management information transmitted from the mobile terminal, to transmit the management information to the management device. The management device includes: a third processor that executes a third process including: second receiving the management information transmitted from one or more of the base stations; identifying identification information of the mobile terminal from the received management information; and transmitting the management information to a terminal of the management organization corresponding to identification information of the terminal of the management organization to which the mobile terminal belongs, based on the identified identification information.

12 Claims, 5 Drawing Sheets

(58) Field of Classification Search
CPC .. G01C 13/002; G08G 3/02; G06F 17/30575; G09B 5/02
USPC ............ 455/12.1, 517; 705/104.1; 434/350; 707/623; 370/254
See application file for complete search history.

(56) References Cited

FOREIGN PATENT DOCUMENTS

| | | |
|---|---|---|
| JP | 7-203519 | 8/1995 |
| JP | 2001-202589 | 7/2001 |
| JP | 2001-283145 | 10/2001 |
| JP | 2002-267769 | 9/2002 |
| JP | 2003-123199 | 4/2003 |
| JP | 2004-252823 | 9/2004 |
| JP | 2005-189165 | 7/2005 |
| JP | 2006-295397 | 10/2006 |
| JP | 2008-9846 | 1/2008 |
| JP | 2010-223639 | 10/2010 |
| JP | 2013-172324 | 9/2013 |
| JP | 2014-13145 | 1/2014 |

OTHER PUBLICATIONS

"Master Plan of Shore-Based Facilities for the Global Maritime Distress and Safety System (GMDSS Master Plan)", International Maritime Organization, May 23, 2011, <http://www.imo.org/blast/blastDataHelper.asp?data_id=306238,filename=13.pdf>, retrieved Mar. 4, 2014, (169 pages).

"Maritime Radio Communication System Global Maritime Distress and Safety System (GMDSS)", Ministry of Internal Affairs and Communications, <http:www.soumu go. jp/soutsu/tokai/musen/kaijou/>, retrieved Mar. 5, 2014.

* cited by examiner

FIG.3

| IDENTIFICATION INFORMATION | BELONGED MANAGEMENT ORGANIZATION | BELONGED PORT | CONTACT INFORMATION 1 | CONTACT INFORMATION 2 | ... |
|---|---|---|---|---|---|
| ON2-888801 | OKINAWA FISHERY RADIO-COMMUNICATION ASSOCIATION | ITOMAN | 098-xxx-xxxx | ooshiro@abcxxx.ne.jp | ... |
| ON2-888802 | OKINAWA FISHERY RADIO-COMMUNICATION ASSOCIATION | ISHIGAKI | 098-xxx-yyyy | uehara@defxxx.ne.jp | ... |
| ON2-888803 | OKINAWA FISHERY RADIO-COMMUNICATION ASSOCIATION | KADENA | 098-xxx-zzzz | ishikawa@ghixxx.ne.jp | ... |
| ... | ... | ... | ... | ... | ... |

121

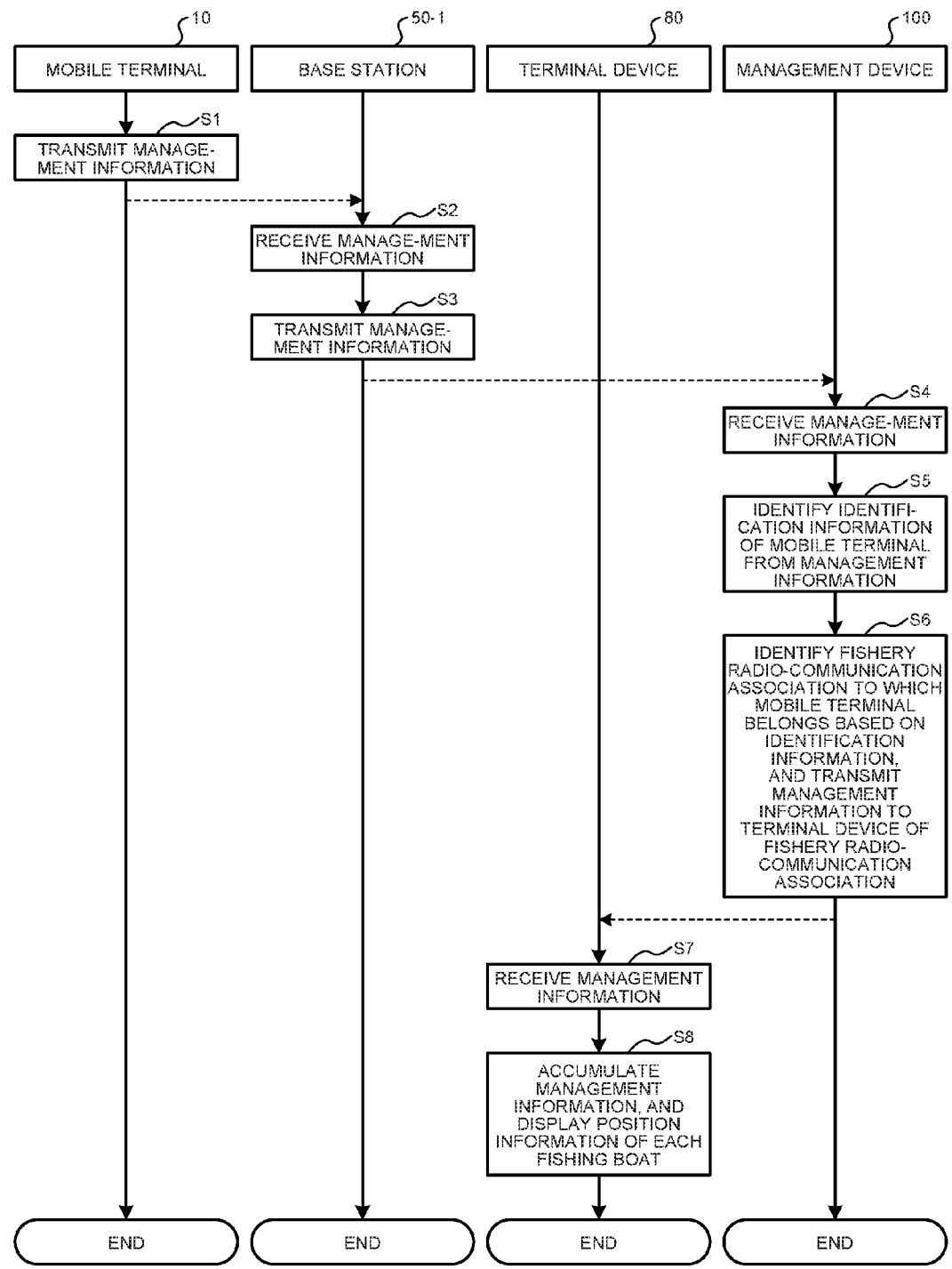

MANAGEMENT SYSTEM AND MANAGEMENT METHOD

CROSS-REFERENCE TO RELATED APPLICATION

This application is a continuation application of International Application No. PCT/JP2014/059595, filed on Mar. 31, 2014 and designating the U.S., the entire contents of which are incorporated herein by reference.

FIELD

The embodiments discussed herein are related to a management system and a management method.

BACKGROUND

Currently, ships with a total tonnage of 20 tons and more are requested to be equipped with a global maritime distress and safety system (GMDSS) as a radio communication system throughout the world (Japanese Laid-open Patent Publication No. 2001-283145 and Japanese Laid-open Patent Publication No. 2008-009846, "Maritime Radio Communication System", [Online], [Searched on Mar. 5, 2014], Internet <http:www.soumu.go.jp/soutsu/tokai/musen/kaijou/>, "GMDSS MASTER PLAN", [Online], [Searched on Mar. 4, 2014], Internet <http://www.imo.org/blast/blastDataHelper.asp?data_id=30623&filename=13.pdf>). However, because the GMDSS is expensive, fishing boats with a total tonnage less than 20 tons are exempted from equipment of GMDSS by practicing "presumptive GMDSS" of orally reporting position information three times a day to the fishery radio communication association responsible for the fishing boats by using a fishery radio.

However, in the presumptive GMDSS, receiving reports from a lot of fishing boats on a 24-hour basis, work of the fishery radio communication association is hard. Moreover, as the fishery radio communication is a voice communication using, for example, a high frequency band such as a single side band (SSB), the reception varies depending on the condition of ionosphere, and communication can be difficult. Therefore, the fishery radio communication association loses contact with a fishing boat, and it is difficult to be aware of the state of the fishing boat, and management of ships is to be difficult. Not limited to the presumptive GMDSS, communicating between land and ships can be similarly difficult, and management of ships is to be difficult.

SUMMARY

According to an aspect of the embodiments, a management system includes: a mobile terminal; a plurality of base stations; and a management device. The mobile terminal includes a first processor that executes a first process including transmitting management information including identification information of the mobile terminal using short waves. The base stations include a second processor that executes a second process including first receiving the management information transmitted from the mobile terminal, to transmit the management information to the management device. The management device includes: a third processor that executes a third process including: second receiving the management information transmitted from one or more of the base stations; identifying identification information of the mobile terminal from the received management information; and referring to a storage that stores identification information of a mobile terminal and identification information of a terminal of a management organization to which the mobile terminal belongs, and transmitting the management information to a terminal of the management organization corresponding to identification information of the terminal of the management organization to which the mobile terminal belongs, based on the identified identification information of the mobile terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 depicts one example of a management-information storage unit;

FIG. 4 is a sequence diagram depicting one example of operation of the management system of the embodiment.

DESCRIPTION OF EMBODIMENTS

Preferred embodiments will be explained with reference to accompanying drawings. Note that the disclosed technique is not limited to the embodiment. Furthermore, the embodiments below may be combined appropriately within a range not causing a contradiction.

Figure 1:
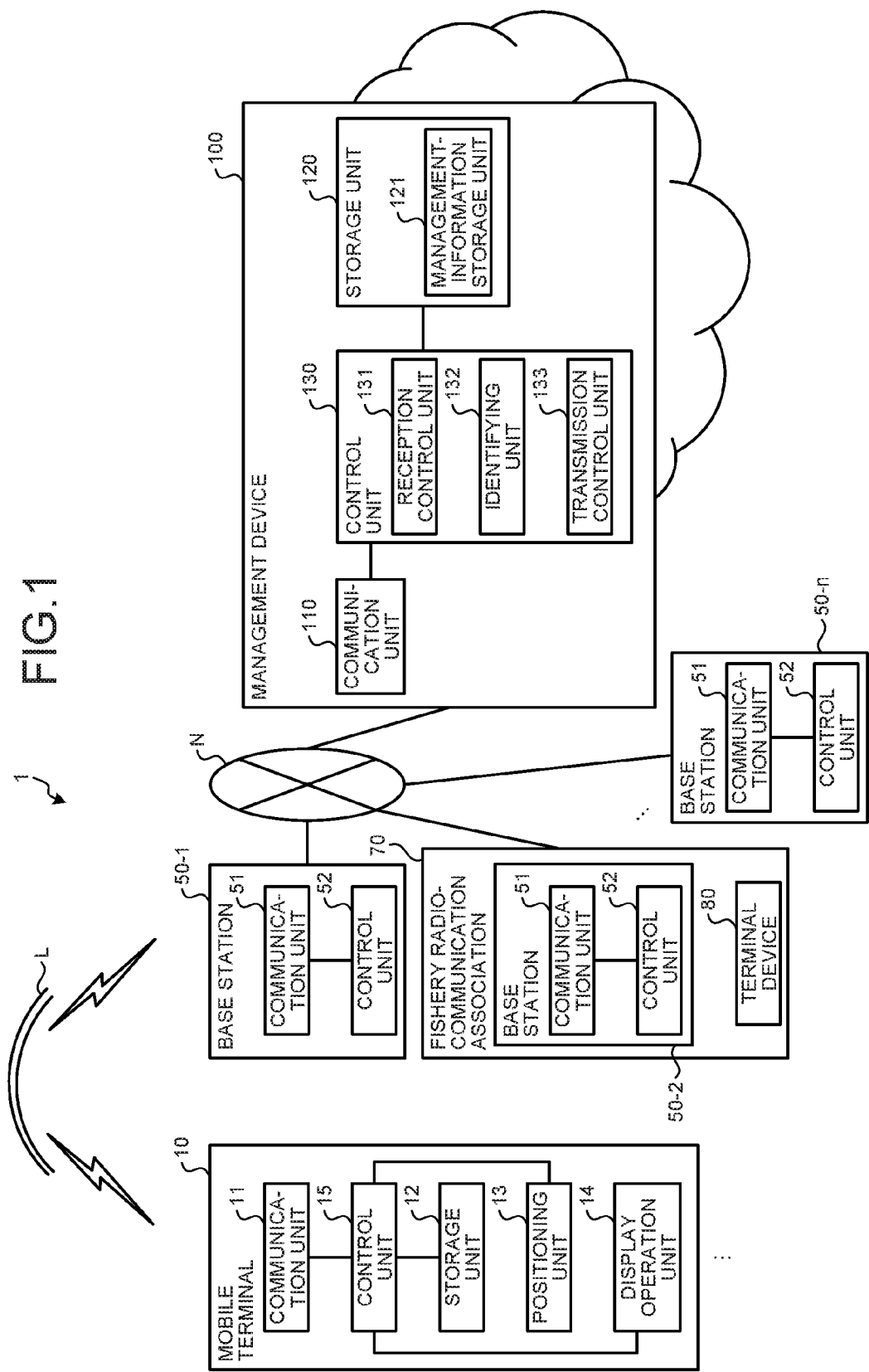
FIG. 1 is a block diagram depicting one example of a configuration of a management system of an embodiment.

FIG. 1 is a block diagram depicting one example of a configuration of the management system of the embodiment. A management system 1 depicted in FIG. 1 includes a mobile terminal 10, multiple base stations 50, a terminal device 80, and a management device 100. Although FIG. 1 depicts a case of the system having a single unit of the mobile terminal 10, the number of the mobile terminal 10 is not limited, and the management system 1 can include arbitrary number of the mobile terminal 10.

The mobile terminal 10 and the base stations 50 are connected such that mutual communication is enabled by radio waves of a high frequency band using reflection of an ionosphere L. Furthermore, the base stations 50, the terminal device 80, and the management device 100 are connected such that mutual communication is enabled through a network N. To the network N, any kind of communication network such as the Internet, a local area network (LAN), and a virtual private network (VPN) can be applied regardless of wired or wireless.

An outline of the management system 1 is explained. In the following, a fishing boat is explained as one example of ships. In the management system 1, for example, the mobile terminal 10 is installed on a fishing boat that operates in a deep sea, for example, in a sea area 200 or more nautical miles away from a coast, and the base station 50 and the terminal device 80 are installed in a fishery radio-communication association 70 that is established near a fishing port. Moreover, in the management system 1, the management device 100 is provided, for example, on a cloud of a data center or the like, and is connected to each of the base stations 50 and the terminal device 80 through the network N. In the example depicted in FIG. 1, a base station 50-1 is installed in, for example, Hokkaido, and a base station 50-2 is installed in, for example Okinawa. Although a case in which the fishery radio-communication association 70 is just one, for the sake of simplicity, and the base station 50-2 and the terminal device 80 are installed in the fishery radio-communication association 70 is depicted in FIG. 1, it is not limited thereto. The base station 50 may be provided independently, or in the other fishery radio-communication association 70. Similarly, the terminal device 80 is provided in the other fishery radio-communication association 70 as the terminal device 80 of the fishery radio-communication association 70.

The fishing boat on which the mobile terminal 10 is installed transmits management information including position information that indicates the position of the fishing boat at least three times a day to at least one of the base stations 50 using a radio of a high frequency band, to perform the presumptive GMDSS. A radio wave that has been transmitted from the mobile terminal 10 is reflected on the ionosphere L to reach at least one of the base stations 50 among the base stations 50 located farther than the line-of-sight distance. Receiving the radio wave transmitted from the mobile terminal 10 and acquiring the management information, the base station 50 to which the radio wave arrives transmits the acquired management information to the management device 100 through the network N. Suppose the radio wave transmitted from the mobile terminal 10 is received by the base station 50 of the fishery radio-communication association 70 that is a different one from the fishery radio-communication association 70 to which the fishing boat on which the mobile terminal 1 is installed belongs.

Receiving the management information, the management device 100 identifies identification information of the mobile terminal 10, that is, identification information of the fishing boat on which the mobile terminal 10 is installed, from the management information. The management device 100 refers to a management-information storage unit 121 described later, and transmits the management information to the terminal device 80 installed in the fishery radio-communication association 70 to which the fishing boat belongs. Thus, the management device 100 can transmit the management information of the fishing boat that is difficult to communicate directly with the belonged fishery radio-communication association 70 by radio waves in a high frequency band, to the belonged fishery radio-communication association 70. Therefore, management of deep-sea fishing boats is facilitated.

Subsequently, respective components constituting the management system 1 are explained. The mobile terminal 10 includes a communication unit 11, a storage unit 12, a positioning unit 13, a display operation unit 14, and a control unit 15. The mobile terminal 10 may include various kinds of functional units included in an existing computer, for example, functional units such as various input devices, sound output devices, and the like, in addition to the functional units depicted in FIG. 1. As one example of the mobile terminal 10, a tablet terminal, a portable personal computer, and the like can be adopted. The mobile terminal 10 is a transmitter that transmits management information using shortwaves.

The communication unit 11 is implemented by a radio of a medium frequency to a high frequency band. The communication unit 11 is connected at least one of the base stations 50 through the ionosphere L, and is a communication interface that controls communication of information with the management device 100 through the base station 50 and the network N. The communication unit 11 transmits management information input from the control unit 15 to the base station 50. Moreover, the communication unit 11 receives radio waves transmitted from the base station 50 and acquires various kinds of information.

The communication unit 11 can use frequency bands of at least one of 2 megahertz (MHz) band, 4 MHz band, 8 MHz band, 12 MHz band, and 16 MHz band, for example, for a radio wave of a medium frequency to a high frequency band. The communication unit 11 uses, for example, a frequency band that is selected according to a distance from land and a time period by an operator of the mobile terminal 10. This is because the propagation condition of radio waves in a medium and a high frequency band is affected by the ionosphere, the state of which changes according to a solar activity and a time of a day being daytime or nighttime. Note that selection of a frequency may be performed such that a distance to the representative base station 50 is calculated based on position information acquired by positioning performed by the positioning unit 13, weighting of frequencies is performed based on the calculated distance, a season, and a time, and a frequency having the highest possibility of delivery is selected.

The communication unit 11 can use, for example, digital modulation such as phase shift keying (PSK) and frequency shift keying (FSK) as a modulation scheme. Furthermore, the communication unit 11 can use, for example, a modulation scheme such as PSK31 in a low frequency band. For example, the PSK31 is slow having the transmission speed of 31 baud; however, the occupied bandwidth is narrow and is suitable for data communication by a high frequency band to communication text data mainly. As a connecting method with the control unit 15, the communication unit 11 applies serial communication using RS-232C for control of the communication unit 11, and can input and output a modulation signal using a voice input/output terminal for communication of data including management information. When an existing radio set that has been equipped on a ship is used, a modulation device to perform digital modulation in a high frequency band can be arranged separately. In this case, when digital information output from the control unit 15 is received, the digital information is modulated into an analog waveform, to be output to the radio set.

The storage unit 12 is implemented, for example, by a semiconductor memory device such as a random access memory (RAM) and a flash memory, or a storage device such as a hard disk drive and an optical disk. The storage unit 12 stores various kinds of information to be included in the management information, information used in processing by the control unit 15, and the like.

The positioning unit 13 receives a signal of a navigation satellite system. The positioning unit 13 performs positioning by receiving signals from a global navigation satellite system such as a global positioning system (GPS), a global navigation satellite system (GLONASS), Galileo, and Compass as the navigation satellite system. Requested positioning from the control unit 15, the positioning unit 13 performs positioning, and outputs a positioning result as position information based on a geodetic system such as a world geodetic system (WGS) 84. Moreover, when requested to continue positioning consecutively from the control unit 15, the positioning unit 13 performs positioning consecutively, and continues outputting position information until requested to stop by the control unit 15. The positioning unit 13 may receive signals of a regional navigation satellite system such as Quasi-Zenith Satellites System, Indian Regional Navigation Satellite System, Doppler Orbitography and Radio-Positioning Integrated by Satellite (DORIS), and BeiDou, as the navigation satellite system.

The display operation unit 14 is a display device to display various kinds of information, and is an input device that accepts various kinds of operations made by a user. For example, the display operation unit 14 is implemented by a liquid crystal display and the like as the display device. Furthermore, for example, the display operation unit 14 is implemented by a touch panel and the like as the input device. That is, the display operation unit 14 unifies the display device and the input device. Moreover, the display operation unit 14 displays, for example, a keyboard at a bottom of a screen and accepts a key input, as a user interface. The display operation unit 14 outputs an operation input by a user to the control unit 15 as operation information.

The control unit 15 is implemented by a central processing unit (CPU) or a micro processing unit (MPU) executing a program that is stored in an internal storage device using a RAM as a work area. Moreover, the control unit 15 may be implemented, for example, by an integrated circuit such as an application specific integrated circuit (ASIC) and a field programmable gate array (FPGA). The control unit 15 performs overall control of the mobile terminal 10. Furthermore, the control unit 15 acquires position information from the positioning unit 13 at least three times a day, and transmits the acquired management information including the position information to the base station 50 through the communication unit 11, to perform the presumptive GMDSS.

The control unit 15 requests positioning to the positioning unit 13. The control unit 15 outputs either a request for single positioning or a request for consecutive positioning to the positioning unit 13 as the positioning request. When position information in response to the positioning request is input from the positioning unit 13, the control unit 15 inserts the position information in a message format to create a message to be the management information. The control unit 15 outputs the created message, that is the management information, to the communication unit 11. The control unit 15 may encrypt a part of the position information such that only the terminal device 80 in the fishery radio-communication association 70 to which the fishing boat having the mobile terminal 10 installed belongs can decrypt.

Figure 2:
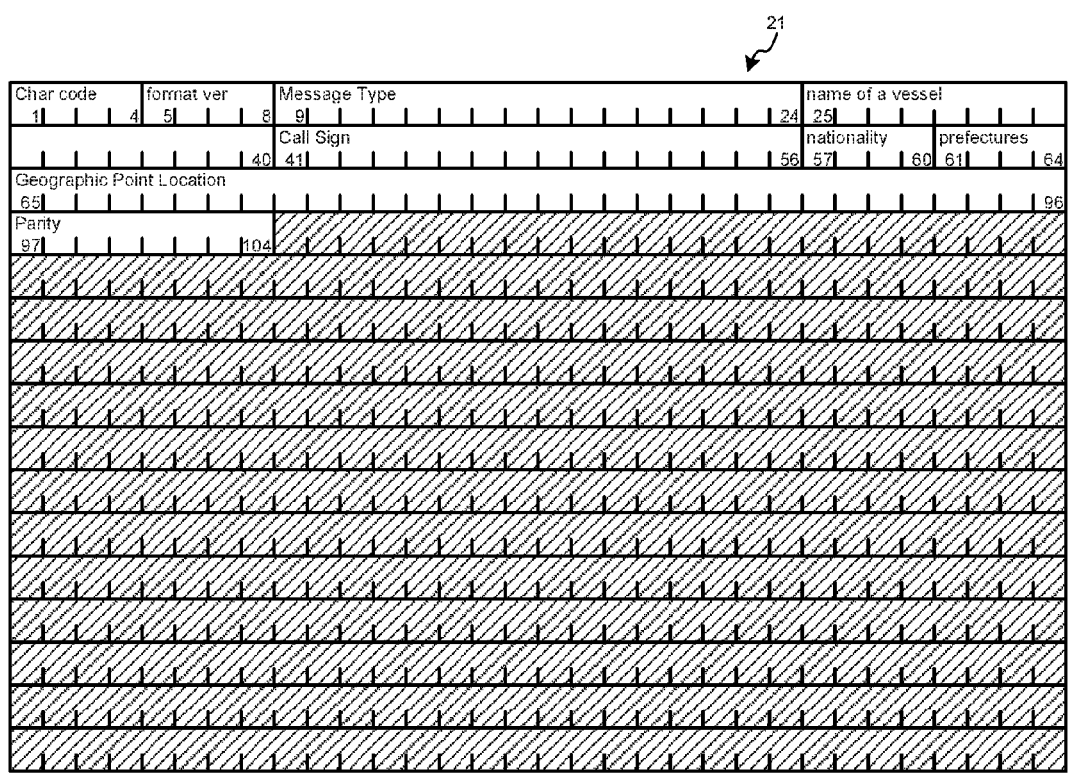
FIG. 2 depicts one example of a message format.

FIG. 2 depicts one example of a message format. As depicted in FIG. 2, for example, a message format 21 has items of "Char code", "format ver", "Message type", "name of a vessel", "Call sign", "nationality", "prefectures", "Geographic Point Location", and "Parity". In the message format 21 depicted in FIG. 2, for example, one square corresponds to 1 byte. Moreover, although a length of the message format 21 depicted in FIG. 2 is 104 bytes as one example, it is not limited thereto, and can be any length. Furthermore, the message format 21 may have other items to be forwarded, such as a radio-communication association code, and a mask level for position information that indicates a level of masking a part of the position information, that is a level of encryption.

"Char code" indicates a character code system. "format ver" indicates a version the message format 21, and is an item to support format changes. "Message Type" indicates a message type, and expresses a kind of message such as automatic, manual, sending a request, and emergency, for example. "name of a vessel" indicates a name or identification information of a fishing boat on which the mobile terminal 10 is installed. Note that "name of a vessel" may be arranged to express a name of a fishing boat and identification if the number of characters allows. "Call sign" indicates a call sign of a radio station for accurate identification. "nationality" is a shortened form of "nationality registration", and indicates a ship registry code. "prefectures" indicates a belonged municipality. "geographic Point Location" indicates position information, and expresses, for example, a geodetic system, a longitude, and a latitude. "Parity" indicates parity to confirm complete reception of a message.

Returning back to explanation of FIG. 1, the base station 50 includes a communication unit 51, and a control unit 52. The base station 50 has, for example, a radio set per frequency band, and a not illustrated antenna is connected to each radio set. The radio set can communication with the mobile terminals 10 that are installed in multiple fishing boats at the same time in the respective frequency bands.

The communication unit 51 is implemented, for example, by a radio set of a middle to a high frequency band, and the like. Moreover, the communication unit 51 is implemented by, for example, a network interface card, and the like to perform communication with the management device 100 through the network N. The communication unit 51 is wirelessly connected to at least one of the mobile terminals 10 through the ionosphere L, and is connected to the management device 100 through the network N. That is, the communication unit 51 is a communication interface that controls communication of information between the mobile terminal 10 and the base station 50, and between the base station 50 and the management device 100. That is, the base station 50 relays communication between the mobile terminal 10 and the management device 100. The communication unit 51 establishes connection to the network N with a wired or wireless connection.

The communication unit 51 receives a radio wave that is transmitted from the mobile terminal 10 by using multiple radio sets, for example, five units of radio sets corresponding to 2 MHz band, 4 MHz band, 8 MHz band, 12 MHz band, and 16 MHz band, as radio sets of a middle to high frequency band. The communication unit 51 receives radio waves transmitted from the multiple mobile terminals 10 using radio waves in different frequencies from each other, with the multiple radio sets of corresponding frequencies. The frequency band to be used is determined according to at least one of a position of a fishing boat on which the mobile terminal 10 is installed and a time period. Moreover, as a modulation scheme, the communication unit 51 applies a modulation scheme similar to that of the communication unit 11 of the mobile terminal 10. Furthermore, as for connection to the control unit 52 also, the communication unit 51 can use serial communication using RS-232C and data communication using a voice input/output terminal similarly to the mobile terminal 10. When an existing radio set that has been installed in the base station is used, a modulation device to perform digital modulation in a high frequency band can be arranged separately. In this case, when an analog waveform received by the radio set is acquired, the analog waveform is modulated into digital information, to be output to the control unit 52.

The communication unit 51 extracts management information from the received radio waves, to output to the control unit 52. Moreover, the communication unit 51 transmits the extracted management information to the management device 100 through the network N using NIC.

The control unit 52 performs overall control of the base station 50. When management information is input from the communication unit 51, the control unit 52 causes, for example, a not illustrated display unit to display that management information is received. The control unit 52 is, for example, a computer for control of the base station 50, and may be, for example, a built-in computer, or a stationary personal computer and the like.

The terminal device 80 is installed in, for example, the fishery radio-communication association 70, and is a computer that receives, from the management device 100, provision of management information that is transmitted from the mobile terminal 10 of a fishing boat that belongs to the fishery radio-communication association 70. As one example of the terminal device 80, a personal computer can be adopted. For the terminal device 80, not only a stationary terminal such as the above personal computer, but also various kinds of mobile terminal devices can be adopted as the terminal device 80. The terminal device 80 stores the management information received from the management device 100 through the network N in a not illustrated storage unit in an accumulated manner. Moreover, the terminal device 80 manages, for example, a fishing boat that belongs to the fishery radio-communication association 70. The terminal device 80 manages, for example, information about identification information of a fishing boat, a captain, a date of departure, a fishery area, a planned date of return to a port, and the like as the management information of the fishing boat.

The management device 100 includes a communication unit 110, a storage unit 120, and a control unit 130. The management device 100 may include various kinds of functional units included in an existing computer, for example, functional units such as various input devices, sound output devices, and the like, in addition to the functional units depicted in FIG. 1. Furthermore, the management device 100 may be structured on a so-called cloud, and be arranged to allow expansion and modification of configuration freely.

The communication unit 110 is implemented, for example by a NIC, and the like. The communication unit 110 is connected to the base station 50 through the network N by wired or wireless connection, and is a communication interface that controls communication of information with the base station 50. The communication unit 110 receives management information from the base station 50. The communication unit 110 outputs the received management information to the control unit 130. Moreover, the communication unit 110 receives management information identifying identification information of the mobile terminal 10, input from the control unit 130. The communication unit 110 transmits the input identified management information to the terminal device 80 of the fishery radio-communication association 70 to which the fishing boat having the mobile terminal 10 that has transmitted the management information belongs.

The storage unit 120 is implemented, for example by a semiconductor memory device such as a RAM and a flash memory, or a storage device such as a hard disk drive and an optical disk. The storage unit 120 has a management-information storage unit 121. Furthermore, the storage unit 120 stores information used in processing by the control unit 130.

The management-information storage unit 121 stores identification information of a fishing boat, a belonged management organization, a belonged port, and contact information, in associated manner. FIG. 3 depicts one example of a management-information storage unit. As depicted in FIG. 3, the management-information storage unit 121 has items of "identification information", "belonged management organization", "belonged port", "contact information 1", and "contact information 2".

"identification information" is, for example, a fishing-boat registration number, and identifies a fishing boat. "belonged management organization" indicates a management organization to which a fishing boat belongs, for example, a fishery radio-communication association, and the like. "belonged port" indicates a port to which a fishing boat belongs. The port to which a fishing boat belongs corresponds to, for example, a fishery cooperative to which a fishing boat belongs. "contact information 1" and "contact information 2" indicate, for example, a contact phone number, a contact mail address, and the like of family of a captain of a fishing boat.

Returning back to explanation of FIG. 1, the control unit 130 is implemented, for example, by a CPU, an MPU, or the like executing a program that is stored in an internal storage device using a RAM as a work area. Moreover, the control unit 130 may be implemented, for example, by an integrated circuit such as an ASIC and an FPGA. The control unit 130 includes a reception control unit 131, an identifying unit 132, and a transmission control unit 133, and implements or performs information processing functions and actions explained below. The internal configuration of the control unit 130 is not limited to the configuration depicted in FIG. 1, and may have another configuration as long as being a configuration of performing the information processing described later.

The reception control unit 131 receives management information from the multiple base stations 50 through the communication unit 110 and the network N. The reception control unit 131 receives management information that is transmitted at intervals of a predetermined time or longer from one of the mobile terminals 10 as management information. The predetermined time can be set to, for example, 3 hours. This is for the reception control unit 131 to allow, for example, when the mobile terminal 10 transmits management information at 6-hour intervals, some fluctuations in time intervals, not limiting to precise 6-hour intervals. The reception control unit 131 may receive management information that is transmitted at intervals shorter than the predetermined time from the mobile terminal 10, or may leave it without receiving. The reception control unit 131 receives, from the multiple base stations 50, management information that has been transmitted from the same mobile terminal 10, depending on a propagation state of radio waves. The reception control unit 131 outputs the received management information to the identifying unit 132.

When management information is input from the reception control unit 131, The identifying unit 132 identifies identification information of the mobile terminal 10 from the received management information based on the message format 21. For the identification information, a fishing-boat registration number that identifies a fishing boat, or a call sign that is assigned to a radio station of the mobile terminal 10 may be used. The identifying unit 132 outputs the received management information to the transmission control unit 133 in association with the identified identification information.

When the management information and the identification information associated therewith are input from the identifying unit 132, the transmission control unit 133 refers to the management-information storage unit 121, and identifies a management organization to which the mobile terminal 10 belongs based on the identification information. That is, the transmission control unit 133 identifies the fishery radio-communication association 70 to which the fishing boat having the mobile terminal 10 installed therein belongs based on the identification information. The transmission control unit 133 transmits the management information to the terminal device 80 of the identified fishery radio-communication association 70 through the communication unit 110 and the network N.

When the identification information of the management information input from the identifying unit 132 is identical to identification information of the management information that has been transmitted to the terminal device 80 of the fishery radio-communication association 70 within a predetermined time, the transmission control unit 133 discards the input management information and the identification information. That is, the transmission control unit 133 does not transmit the input management information and the identification information as the second or later management information received by the multiple base stations 50, to the terminal device 80 of the fishery radio-communication association 70.

When a part of position information included in the management information is encrypted, the transmission control unit 133 transmits the management information to the terminal device 80 of the identified fishery radio-communication association 70 as it is leaving the part of position information encrypted, without decoding the position information, through the communication unit 110 and the network N.

Moreover, the transmission control unit 133 transmits, to a not illustrated terminal device of a person concerned about the fishing boat on which the mobile terminal 10 is installed, reception information indicating that the management information transmitted from the mobile terminal 10 is received through the communication unit 110 and the network N. The transmission control unit 133 refers to, for example, the management-information storage unit 121 to acquire a mail address of the person concerned, and transmits the reception information as an e-mail. The reception information may indicate only that the management information is received, or may include other information such as the position information in addition thereto.

Furthermore, when the management information includes information identifying emergency information, the transmission control unit 133 immediately transmits the management information to a not illustrated organization that deals with emergency information, for example, to Japan Coast Guard, or the like. Thus, the management device 100 can transmit emergency information to an organization capable of dealing therewith promptly.

Next, operation of the management system 1 of the embodiment is explained. In the following explanation, a case of performing the presumptive GMDSS by a fishing boat that fishes in a deep sea is explained as one example of the operation of the management system 1. Moreover, in the following explanation, a case in which the mobile terminal 10 belongs to the fishery radio-communication association 70 having the base station 50-2, and a radio wave transmitted from the mobile terminal 10 is not received by the base station 50-2 but can be received by the other base station 50-1 is explained.

FIG. 4 is a sequence diagram depicting one example of operation of the management system of the embodiment. The control unit 15 of the mobile terminal 10 installed on the fishing boat requests the positioning unit 13 to perform positioning, for example, when it becomes a predetermined time set in advance. When position information in response to the position request is input from the positioning unit 13, the control unit 15 inserts the position information in the message format 21 to create management information, and transmits the created management information to the multiple base stations 50 through the communication unit 11 (step S1).

The communication unit 51 of the base station 50-1 receives a radio wave transmitted from the mobile terminal 10. That is, the communication unit 51 receives the management information that is included in the received radio wave (step S2). The communication unit 51 transmits the received management information to the management device 100 through the network N (step S3).

The reception control unit 131 of the management device 100 receives the management information from the base station 50-1 through the network N (step S4). The reception control unit 131 outputs the received management information to the identifying unit 132. When the management information is input from the reception control unit 131, the identifying unit 132 identifies identification information of the mobile terminal 10 from the received management information based on the message format 21 (step S5). The identifying unit 132 outputs the received management information and the identified identification information in an associated manner to the transmission control unit 133.

When the management information and the identification information associated therewith are input from the identifying unit 132, the transmission control unit 133 refers to the management-information storage unit 121, and identifies the fishery radio-communication association 70 to which the fishing boat having the mobile terminal 10 installed therein belongs, based on the identification information. The transmission control unit 133 transmits the management information to the terminal device 80 of the identified fishery radio-communication association 70 through the communication unit 110 and the network N (step S6).

The terminal device 80 receives the management information from the management device 100 through the network N (step S7). The terminal device 80 stores the received management information in the storage unit in an accumulated manner (step S8). Furthermore, for example, the terminal device 80 plots the position information of the fishing boat belonging thereto on a map, and causes a not illustrated display unit to display the plots to provide the position information to a user of the terminal device 80. Thus, even when the base station 50-2 of the fishery radio-communication association 70 to which the fishing boat having the mobile terminal 10 installed therein belongs does not receive the management information transmitted from the mobile terminal 10 directly, the fishing boat on which the mobile terminal 10 is installed can send a message to the belonged fishery radio-communication association 70.

As described, the management system 1 includes the mobile terminal 10, the multiple base stations 50, and the management device 100. The mobile terminal 10 has the communication unit 11 that transmits management information including identification information of the mobile terminal 10 using shortwaves. The multiple base stations 50 have the communication unit 51 that receives the management information transmitted from the mobile terminal 10, to transmit the management information to the management device 100. The management device 100 has the reception control unit 131 that receives the management information transmitted from at least one of the base stations 50, and the identifying unit 132 that identifies identification information of the mobile terminal 10 from the received management information. Moreover, the management device 100 has the transmission control unit 133 that refers to the management-information storage unit 121 that stores identification information of the mobile terminal 10 and identification information of the terminal device 80 of the management organization to which the mobile terminal 10 belongs, and that transmits the management information to the terminal device 80 of the management organization corresponding to the identification information of the terminal device 80 of the management organization to which the mobile terminal 10 belongs, based on the identified identification information of the mobile terminal 10. As a result, management of ships is facilitated.

Furthermore, the mobile terminal 10 of the management system 1 further includes the control unit 15 that creates management information in a digital value, and a modulation device that converts the digital value into an analog waveform to transmit in a frequency band of shortwaves, and the communication unit 11 transmits the management information that has been converted into the analog waveform by the modulation device. Accordingly, an existing radio set can be used as the communication unit 11.

Moreover, each of the base stations 50 of the management system 1 has a modulation device that converts, when the analog waveform transmitted in a frequency band of shortwaves is received, the analog waveform into a digital value. Accordingly, an existing radio set can be used as the communication unit 51.

Furthermore, each of the base stations 50 of the management system 1 is arranged to be able to receive a radio signal of a common frequency of short waves. Accordingly, management information from a ship can be received irrespective of a propagation state of radio waves.

Moreover, each of the base stations 50 of the management system 1 has multiple receivers, and when more than one common frequency is set, each of the receivers is configured to receive a radio signal of either frequency among the common frequencies of shortwaves set in plurality. Accordingly, a radio signal according to each of the mobile terminals 10 having different allocated frequencies can be received.

Furthermore, management information of the management system 1 includes position information of the mobile terminal 10. Accordingly, a position of a ship can be traced, and a position of a ship can be managed.

Moreover, the mobile terminal 10 of the management system 1 transmits management information, when the management information includes position information of the mobile terminal 10, encrypting a part of the position information. Accordingly, detailed position information can be concealed from a management organization and the like other than a management organization to which the ship belongs.

Furthermore, the management device 100 of the management system 1 executes, when identification information included in received management information and identification information included in management information that has been transmitted to the terminal device 80 of a management organization within a range of a predetermined time are identical to each other, a control of not transmitting the received management information to the terminal device 80 of the management organization. Accordingly, duplication of position information from the same ship can be avoided.

Moreover, the management device 100 of the management system 1 refers to the storage unit in which contact information of a person concerned that is associated with the identification information of the mobile terminal 10 is stored, and transmits reception information indicating that the management information is received to the person concerned of the mobile terminal 10 that corresponds to the identified identification information. Accordingly, safety information and position information can be provided to a person concerned of a ship.

Furthermore, the mobile terminal 10 of the management system 1 is installed on a ship. Accordingly, management of the ship is enabled.

Moreover, the communication unit 11 of the mobile terminal 10 in the management system 1 determines a frequency of shortwaves, according to at least one of a position of the mobile terminal 10 and a time period in which management information is transmitted. Accordingly, the management information transmitted according to a propagation condition of radio waves can be received.

Furthermore, the management system 1 includes the multiple base stations 50 that are configured to be able to receive shortwaves of the same frequency using a first network. The management system 1 includes the information processing device 100 that receives information transmitted from at least one of the base stations 50, using a second network that is different from the first network. Accordingly, the information processing device 100 can receive information of a radio signal of shortwaves received by either one of the base stations 50.

Although the reception information is transmitted to a person concerned of a fishing boat on which the mobile terminal 10 is installed from the management device 100 in the above embodiment, it is not limited thereto. For example, a web server function may be added to the management device 100, and may display a map on which position information of each fishing boat is plotted on a web page on the Internet to allow a person concerned of a fishing boat to see the web page by logging into the web page. Thus, as the person concerned of the fishing boat sees the position of the fishing boat plotted on a map, the person concerned of the fishing boat can grasp the position of the fishing boat more easily.

Moreover, although the antenna connected to the communication unit 51 of the base station 50 is connected per radio set in the above embodiment, it is not limited thereto. For example, a multiband antenna may be applied, or an antenna tuner may be applied. Furthermore, different frequencies may be used for transmission from a ship to land, and transmission from land to a ship. Thus, conditions of antenna installation location are eased.

Furthermore, although PSK31 is used as one example of digital modulation in the above embodiment, it is not limited thereto. For example, narrow-band digital modulation applicable to a high frequency band, such as Radioteletype (RTTY), packet communication, and slow scan television (SSTV), may be used. Thus, in a band of high frequencies in a shortwave band, data communication with a larger data amount can be performed.

Moreover, the respective illustrated components of each unit are not necessarily requested to be configured physically as illustrated. That is, a specific mode of distribution or integration of the respective devices is not limited to the ones illustrated in the drawings, and all or a part thereof can be distributed or integrated functionally or physically in an arbitrary unit according to various kinds of loads, a use condition, and the like. For example, although a case of installing the terminal device 80 in the fishery radio-communication association 70 together with the base station 50 has been explained in the above embodiment, the terminal device 80 may be installed in a different place from the base station as long as the terminal device 80 can communicate with the management device 100.

Furthermore, the various kinds of processing functions performed in the respective devices may be configured such that all or an arbitrary part thereof is performed on a CPU (or a microcomputer such as an MPU, and a micro controller unit (MCU)) Moreover, it is needless to say that the various kinds of processing functions may be configured such that all or an arbitrary part thereof is performed on a program that is analyzed and executed by the CPU (or a microcomputer such as an MPU and an MCU), or on hardware by wired logic.

Figure 5:
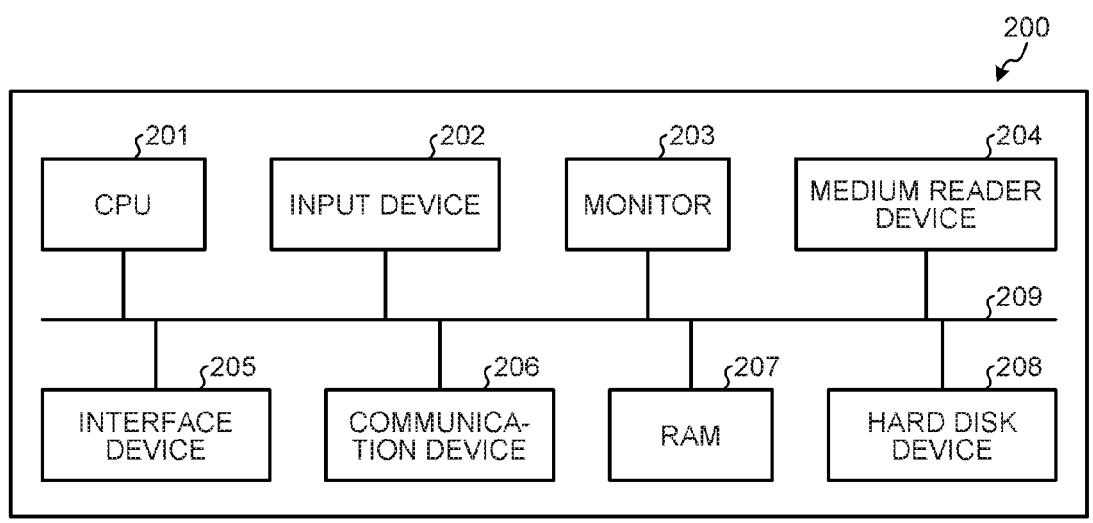
FIG. 5 is a block diagram depicting one example of a computer that executes a management program.

Moreover, as for the various kinds of processing explained in the above embodiment can be implemented by executing a program prepared in advance by a computer. In the following, one example of a computer that executes a program having functions similar to those of the above embodiment is explained. FIG. 5 is a block diagram depicting one example of a computer that executes a management program.

As depicted in FIG. 5, a computer 200 includes a CPU 201 that performs various arithmetic processing, an input device 202 that accepts a data input, and a monitor 203. Furthermore, the computer 200 includes a medium reader device 204 that reads a program and the like from a storage medium, an interface device 205 to connect to various kinds of devices, and a communication device 206 to connect to another information processing device, and the like by wired or wireless connection. Moreover, the computer 200 includes a RAM 207 that temporarily stores various kinds of information, and a hard disk device 208. The respective devices 201 to 208 are connected to a bus 209.

The hard disk device 208 stores a management program that has functions similar to those of the respective processing units of the reception control unit 131, the identifying unit 132, and the transmission control unit 133 depicted in FIG. 1. Furthermore, the hard disk device 208 stores the management-information storage unit 121 and various kinds of data to implement the management program. The input device 202 accepts an input of various kinds of information such as information about an operation from an administrator of the computer 200. The monitor 203 displays, for example, various kinds of screens to an administrator of the computer 200. To the interface device 205, for example, a printer device and the like are connected. The communication device 206 has functions similar to those of the communication unit 110 depicted in FIG. 1, and is connected to the network N, and communicates various kinds of information such as the management information, with the base station 50.

The CPU 201 reads each program stored in the hard disk device 208, unwinds on the RAM 207 to execute the program, thereby performing various kinds of processing. Moreover, these programs can cause the computer 200 to serve as the reception control unit 131, the identifying unit 132, and the transmission control unit 133 depicted in FIG. 1.

The above management program is not necessarily requested to be stored in the hard disk device 208. For example, the program stored in a recording medium readable by the computer 200 may be read by the computer 200 to be executed. The recording medium that is readable by the computer 200 corresponds to, for example, a compact-disk read-only memory (CD-ROM), a digital versatile disk (DVD), a portable recording medium such as a universal serial bus (USB) memory, a semiconductor memory such as a flash memory, a hard disk drive, or the like. Furthermore, the management program may be stored in a device that is connected to a public line, the Internet, a LAN, or the like, and the computer 200 may read the management program therefrom to execute the management program.

Management of ships is facilitated.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A management system comprising:
a mobile terminal;
a plurality of base stations; and
a management device, wherein
the mobile terminal includes a first processor that executes a first process including first transmitting management information including identification information of the mobile terminal using short waves,
the base stations include a second processor that executes a second process including first receiving the management information transmitted from the mobile terminal, to transmit the management information to the management device,
the management device includes:
a third processor that executes a third process including:
second receiving the management information transmitted from one or more of the plurality of base stations;
identifying identification information of the mobile terminal from the received management information; and
referring to a storage that stores identification information of a mobile terminal and identification information of a terminal of a management organization to which the mobile terminal belongs, and transmitting the management information to a terminal of the management organization corresponding to identification information of the terminal of the management organization to which the mobile terminal belongs, based on the identified identification information of the mobile terminal.
2. The management system according to claim 1, wherein the first process further includes:
creating management information in a digital value; and
first converting the digital value into an analog waveform to transmit in a frequency band of shortwaves, and
the second process further includes second transmitting the management information converted into the analog waveform at the first converting.
3. The management system according to claim 1, wherein the second process further includes second converting, when receiving an analog waveform transmitted in a frequency band of shortwaves, the analog waveform into a digital value.
4. The management system according to claim 1, wherein the respective base stations are configured to be able to receive a radio signal of a common shortwave frequency.

5. The management system according to claim 1, wherein each of the base stations includes a plurality of radio sets, and each of the radio sets is configured to receive, when a plurality of the common frequencies are set, a radio signal of either one of the common shortwave frequencies set in plurality.

6. The management system according to claim 1, wherein the management information includes position information of the mobile terminal.

7. The management system according to claim 1, wherein when the management information includes position information of the mobile terminal, the mobile terminal transmits management information in which a part of the position information is encrypted.

8. The management system according to claim 1, wherein the management device performs, when identification information included in the received management information and identification information included in management information that has been transmitted to a terminal of the management organization within a range of a predetermined time period are identical to each other, a control of not transmitting the received management information to the terminal of the management organization.

9. The management system according to claim 1, wherein the management device refers to the storage that stores contact information of a person concerned, the contact information associated with the identification information of the mobile terminal, and transmits reception information indicating that the management information is received, to the person concerned of the mobile terminal corresponding to the identified identification information.

10. The management system according to claim 1, wherein the mobile terminal is installed on a ship.

11. The management system according to claim 1, wherein the first transmitting includes determining the frequency of shortwaves according to a position of the mobile terminal or a time period in which management information is transmitted, or both.

12. A management method comprising:
receiving management information that is transmitted from one or more of a plurality of base stations that has received the management information including identification information of a mobile terminal, the management information transmitted from the mobile terminal using shortwaves, by a processor;
identifying identification information of the mobile terminal from the received management information, by the processor; and
transmitting the management information to a terminal of a management organization corresponding to identification information of the terminal of the management organization to which the mobile terminal belongs, based on the identified identification information of the mobile terminal, by referring to a storage that stores identification information of a mobile terminal and identification information of a terminal of the management organization to which the mobile terminal belongs, by the processor.

* * * * *